United States Patent [19]

Deane

[11] 4,291,576

[45] Sep. 29, 1981

[54] ELECTRICAL TEMPERATURE SENSING MEANS HAVING MOISTURE TIGHT SEALS

[75] Inventor: Kenneth E. Deane, Beech Grove, Ind.

[73] Assignee: Emhart Industries, Inc., Indianapolis, Ind.

[21] Appl. No.: 113,587

[22] Filed: Jan. 21, 1980

[51] Int. Cl.³ .............................................. G01K 1/08
[52] U.S. Cl. ................................. 73/352; 73/362 AR
[58] Field of Search .............. 73/352, 362 R, 362 AR, 73/362 SC

[56] References Cited

U.S. PATENT DOCUMENTS 3,241,370 3/1966 Mertler et al. ........................ 73/352
3,974,696 8/1976 Fitzmayer ............................. 73/352
4,122,322 10/1978 Ohkubo et al. ....................... 73/352

Primary Examiner—Donald O. Woodiel
Attorney, Agent, or Firm—Robert F. Meyer; David W. Gomes

[57] ABSTRACT

A sensing element is carried by a probe and electrically connected to an electrical plug through electrical connectors carried within a flexible cable. Moisture sealing joints are provided between the cable and the probe and plug. An electrically insulative medium is disposed within the plug and extends to the outer surface of the plug. A moisture seal is provided within the plug to provide a seal between the plug and the electrically insulative material.

7 Claims, 4 Drawing Figures

U.S. Patent        Sep. 29, 1981        4,291,576
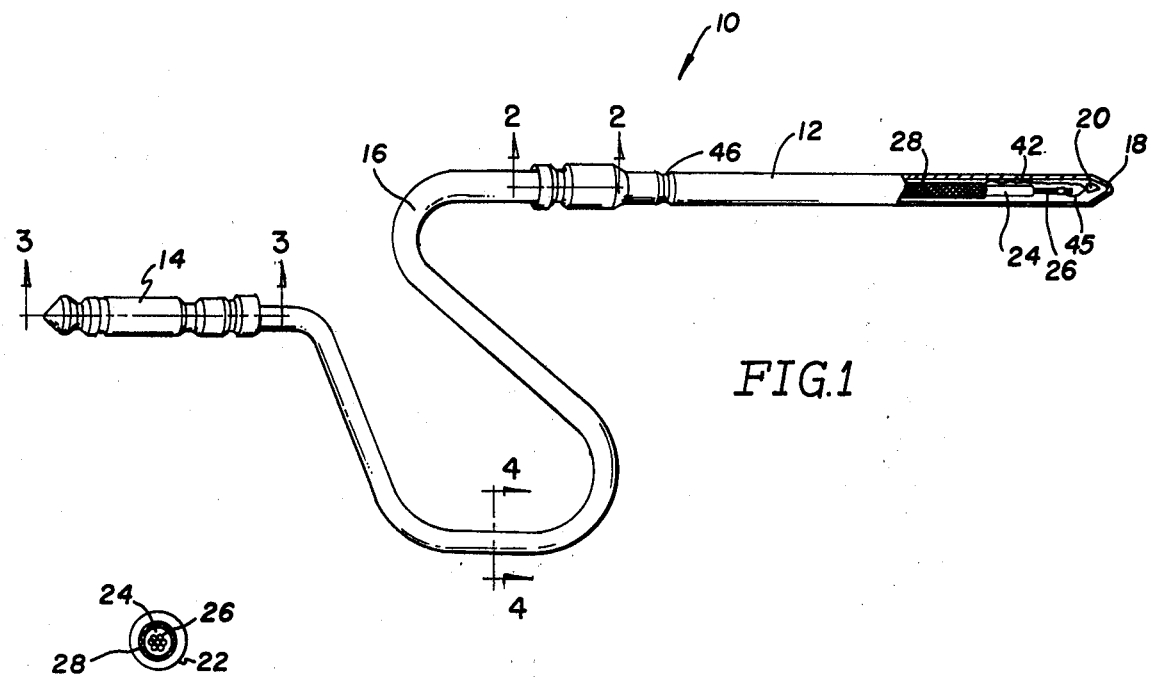
FIG.1
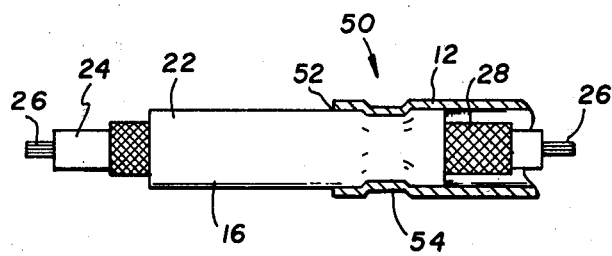
FIG.4
FIG.2
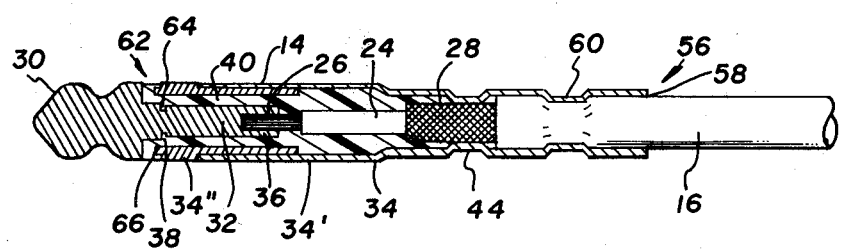
FIG.3

ELECTRICAL TEMPERATURE SENSING MEANS HAVING MOISTURE TIGHT SEALS

BACKGROUND OF THE INVENTION

Generally speaking, the present invention pertains to an improvement in a temperature sensing means wherein a sensing element is carried by a probe and is electrically connected to an electrical plug through electrical connectors carried within a flexible cable, the improvement comprising first and second moisture sealing joints formed between the cable and the probe and between the cable and the electrical plug, an electrically insulative medium extending from an outer surface of and into the plug to prevent short circuiting of electrical conductors therein, and sealing means carried within the plug providing a moisture seal between the electrically insulative medium and the electrical plug.

The present invention pertains to a temperature sensing means and more particularly to a temperature sensing means wherein elements of the sensing means are moisture sealed to prevent environmental moisture leakage.

The temperature sensing means of the present invention is particularly useful in microwave oven applications. In many microwave oven applications, an electrical temperature sensor is inserted into a material to be cooked to monitor its temperature and thus the degree to which the material is cooked. After use, the temperature sensing means needs to be washed and cleaned and preferably by usual household techniques; for example by a dishwasher. This leads to the problem of preventing moisture leakage to the internal workings of the sensor to prevent damage to the electrical elements of the sensor.

OBJECTS OR FEATURES OF THE INVENTION

It is, therefore, a feature of the invention to provide a temperature sensing means which is substantially moisture proof. Another feature of the invention is the provision of such a sensing means wherein a probe carrying a sensing element is connected to an electrical plug by a flexible cable and wherein moisture seals are provided at the ends of the cable between it and the plug and the probe. Another feature of the invention is the provision of such a temperature sensing means wherein an electrically insulative medium is provided between the plug and the cable and wherein moisture sealing means are provided within the plug to provide a seal between the plug and the electrically insulative medium. These and other features of the invention will be apparent from the following description taken in conjunction with the accompanying drawings.

DESCRIPTION OF THE DRAWINGS

FIG. 1 is a view in partial section showing the complete temperature sensing means of the invention.

FIG. 2 is an enlarged section taken along the line 2—2 of FIG. 1.

FIG. 3 is an enlarged section taken along the line 3—3 of FIG. 1.

FIG. 4 is an enlarged section taken along the line 4—4 of FIG. 1.

DETAILED DESCRIPTION OF THE INVENTION

Referring now to the drawings, temperature sensing means 10, in general, includes a probe 12 which is connected to an electrical plug 14 through a flexible cable 16. Probe 12 has a tip portion 18 which, in microwave oven applications, may be stuck into an item to be cooked. A sensing element, such as a thermistor 20, is carried in the tip portion to sense the temperature in the item being cooked. The probe may be fabricated from stainless steel, for example.

Cable 16 includes an outer wall 22 fabricated of a good electrically insulative material such as silicone rubber and an inner flexible tube 24 that is also fabricated from silicone rubber. As shown, tube 24 extends into both probe 12 and electrical plug 14. Carried within tube 24 is an electrical wire 26 that is fabricated from copper. Disposed between tube 24 and outer wall 22 of cable 12 is a radiation shield 28 which also extends into both the probe 12 and electrical plug 14. The shield protects the electrical characteristics of the temperature sensing means from RF interference and is fabricated from an electrically conductive material such as copper.

Electrical plug 14 includes a head portion having a stem 32 extending therefrom and a sleeve 34. Both the head portion and the sleeve may be fabricated from brass or copper. Stem 32 has a hole 36 for receiving electrical wire 26. Sleeve 34 is fabricated in two sections 34' and 34". The sleeve 34 and head portion 30 are electrically insulated from each other through space 38 but are physically connected to each other as well as being electrically insulated from each other through an electrically insulative medium 40 which fills the space and extends to the outer periphery or surface of the plug. Electrically insulative medium 40 includes a polypropylene material which is injection molded in space 38.

Sleeve 34 serves as electrical ground for the complete temperature sensing means. Referring to FIGS. 1 and 3, the electrical circuit to thermistor 20 is from head portion 30 through wire 26 to thermistor 20 through electrical lead 45. The circuit back to ground is from thermistor 20 through electrical lead 42 to shield 28 and back to ground through a crimp 44 in sleeve 34 which engages the sleeve with the shield. Probe 12 is also grounded through a crimp 46 in the probe which engages the probe with shield 28.

According to the invention, the temperature sensing means 10 is provided with moisture seals at three places, (1) the connection between cable 16 and probe 12, (2) the connection between cable 16 and plug 14, and (3) between electrically insulative medium 40 and plug 14. Referring to FIG. 2, a moisture seal joint 50 is provided between flexible cable 16 and probe 12 through an overlapping joint 52 formed by probe 12 overlapping outer wall 22 of the cable and crimp 54 provided in probe 12. Crimp 54 insures a good positive contact between outer wall 22 and probe 12. Referring to FIG. 3, a similar moisture seal joint 56 is provided between cable 16 and plug 14 by an overlapping joint 58 provided by the plug overlapping the cable and by crimp 60 provided in the plug.

Continuing with FIG. 3, a sealing means 62 provides a moisture seal between insulative medium 40 and plug 14. Sealing means 62 includes at least one groove 64 provided in stem 32 and a ring 66 extending into space 38 from sleeve section 34". More specifically, after the polypropylene material of the electrically insulative medium is injection molded into space 38, the groove and the ring prevent slippage of the material which usually arises after the injection molding is complete.

What is claimed is:

1. In a temperature sensing means wherein a sensing element is carried by a probe and is electrically connected to an electrical plug through electrical connectors carried within a flexible cable,
   (a) first and second moisture sealing joints formed between said cable and said probe and said cable and said electrical plug, respectively,
   (b) an electrically insulative medium extending from an outer surface of and molded into a space in said plug to prevent short circuiting of electrical conductors carried therein, and
   (c) a ring carried within said space of said plug providing a moisture seal with said electrically insulative medium.

2. In a temperature sensing means according to claim 1 wherein said first and second moisture sealing joints include overlapping joints between said flexible cable and said probe and said electrical plug.

3. In a temperature sensing element according to claim 2 wherein said probe and said electrical plug overlap said flexible cable.

4. In a temperature sensing element according to claim 3 wherein said probe and electrical plug are crimped around substantially the entire outer surface of said flexible cable.

5. In a temperature sensing means according to claim 1, wherein said plug comprises a head portion and a separate sleeve connected to said flexible cable, wherein said electrically insulative medium extends from said outer surface from an area between said sleeve and said head portion, wherein said ring extends from said separate sleeve into said space near said area, and wherein said insulative medium substantially fills said space between said sleeve and said head.

6. In a temperature sensing means according to claim 5 wherein said sealing means includes a stem extending from said head into said sleeve.

7. In a temperature sensing means according to claim 6 wherein said stem includes at least one groove extending substantially around its outer periphery.

* * * * *